(12) United States Patent
Fay et al.

(10) Patent No.: US 8,316,951 B2
(45) Date of Patent: Nov. 27, 2012

(54) TUBULAR ACTUATOR AND METHOD

(75) Inventors: Peter J. Fay, Houston, TX (US); Yang Xu, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 312 days.

(21) Appl. No.: 12/566,909

(22) Filed: Sep. 25, 2009

(65) Prior Publication Data

US 2011/0073320 A1 Mar. 31, 2011

(51) Int. Cl.
*E21B 34/06* (2006.01)
*E21B 34/10* (2006.01)

(52) U.S. Cl. ........ 166/373; 166/194; 166/383; 166/374; 166/386; 166/332.4

(58) Field of Classification Search .................. 166/373, 166/194, 383, 374, 386, 332.4
See application file for complete search history.

(56) References Cited

U.S. PATENT DOCUMENTS

| | | | |
|---|---|---|---|
| 1,883,071 A | 12/1928 | Stone | |
| 2,769,454 A | 11/1956 | Bletcher et al. | |
| 2,812,717 A | 11/1957 | Brown | |
| 2,822,757 A | 2/1958 | Colberly | |
| 2,973,006 A | 2/1961 | Nelson | |
| 3,007,527 A | 11/1961 | Nelson | |
| 3,013,612 A | 12/1961 | Angel | |
| 3,148,731 A | 9/1964 | Holden | |
| 3,211,232 A | 10/1965 | Grimmer | |
| 3,263,752 A | 8/1966 | Conrad | |
| 3,358,771 A | 12/1967 | Berryman | |
| 3,510,103 A | 5/1970 | Carsello | |
| 3,566,964 A | 3/1971 | Livingston | |
| 3,667,505 A | 6/1972 | Radig | |
| 3,703,104 A | 11/1972 | Tamplen | |
| 3,727,635 A | 4/1973 | Todd | |
| 3,797,255 A | 3/1974 | Kammerer, Jr. et al. | |
| 3,901,315 A | 8/1975 | Parker et al. | |
| 3,954,138 A | 5/1976 | Miffre | |
| 3,997,003 A | 12/1976 | Adkins | |
| 4,067,358 A | 1/1978 | Streich | |
| 4,160,478 A | 7/1979 | Calhoun et al. | |
| 4,176,717 A | 12/1979 | Hix | |
| 4,190,239 A | 2/1980 | Schwankhart | |
| 4,246,968 A | 1/1981 | Jessup et al. | |
| 4,260,017 A | 4/1981 | Nelson et al. | |
| 4,291,722 A | 9/1981 | Churchman | |
| 4,292,988 A | 10/1981 | Montgomery | |

(Continued)

FOREIGN PATENT DOCUMENTS

EP 0427422 A2 5/1991

(Continued)

OTHER PUBLICATIONS

Notification of Transmittal of the International Search Report and the Written Opinion of the International Searching Authority; PCT/US2010/044856; Mailed Apr. 15, 2011.

(Continued)

*Primary Examiner* — Cathleen Hutchins
(74) *Attorney, Agent, or Firm* — Cantor Colburn LLP

(57) ABSTRACT

A tubular actuator includes, a restrictor disposed at a tubular that is engageably receptive to a runnable member run thereagainst as long as pressure remains above a latch pressure, the restrictor configured to allow passage of the runnable member after a delay at pressure equal to or below the latch pressure.

19 Claims, 6 Drawing Sheets

U.S. PATENT DOCUMENTS

| | | | |
|---|---|---|---|
| 4,355,685 A | 10/1982 | Beck | |
| 4,390,065 A | 6/1983 | Richardson | |
| 4,448,216 A | 5/1984 | Speegle et al. | |
| 4,478,279 A | 10/1984 | Puntar et al. | |
| 4,537,383 A | 8/1985 | Fredd | |
| 4,554,981 A | 11/1985 | Davies | |
| 4,566,541 A | 1/1986 | Moussy et al. | |
| 4,576,234 A | 3/1986 | Upchurch | |
| 4,583,593 A | 4/1986 | Zunkel et al. | |
| 4,669,538 A | 6/1987 | Szarka | |
| 4,711,326 A | 12/1987 | Baugh et al. | |
| 4,714,116 A | 12/1987 | Brunner | |
| 4,729,432 A | 3/1988 | Helms | |
| 4,823,882 A | 4/1989 | Stokley et al. | |
| 4,826,135 A | 5/1989 | Mielke | |
| 4,856,591 A | 8/1989 | Donovan et al. | |
| 4,893,678 A | 1/1990 | Stokley et al. | |
| 4,944,379 A | 7/1990 | Haaser | |
| 4,979,561 A | 12/1990 | Szarka | |
| 5,029,643 A | 7/1991 | Winslow et al. | |
| 5,056,599 A | 10/1991 | Comeaux et al. | |
| 5,230,390 A | 7/1993 | Zastresek et al. | |
| 5,244,044 A | 9/1993 | Henderson | |
| 5,297,580 A | 3/1994 | Thurman | |
| 5,305,837 A | 4/1994 | Johns et al. | |
| 5,335,727 A | 8/1994 | Cornette et al. | |
| 5,343,946 A | 9/1994 | Morrill | |
| 5,529,126 A | 6/1996 | Edwards | |
| 5,609,178 A | 3/1997 | Hennig et al. | |
| 5,704,393 A | 1/1998 | Connell et al. | |
| 5,762,142 A | 6/1998 | Connell et al. | |
| 5,775,421 A | 7/1998 | Duhon et al. | |
| 5,775,428 A | 7/1998 | Davis et al. | |
| 5,813,483 A | 9/1998 | Latham et al. | |
| 5,960,881 A | 10/1999 | Allamon et al. | |
| 6,050,340 A | 4/2000 | Scott | |
| 6,053,250 A | 4/2000 | Echols | |
| 6,079,496 A | 6/2000 | Hirth | |
| 6,102,060 A | 8/2000 | Howlett et al. | |
| 6,155,350 A | 12/2000 | Melenyzer | |
| 6,173,795 B1 | 1/2001 | McGarian et al. | |
| 6,220,350 B1 | 4/2001 | Brothers et al. | |
| 6,227,298 B1 | 5/2001 | Patel | |
| 6,253,861 B1 | 7/2001 | Carmichael et al. | |
| 6,293,517 B1 | 9/2001 | Cunningham | |
| 6,378,609 B1 | 4/2002 | Oneal et al. | |
| 6,474,412 B2 | 11/2002 | Hamilton et al. | |
| 6,530,574 B1 | 3/2003 | Bailey et al. | |
| 6,547,007 B2 | 4/2003 | Szarka et al. | |
| 6,634,428 B2 | 10/2003 | Krauss et al. | |
| 6,644,412 B2 | 11/2003 | Bode et al. | |
| 6,666,273 B2 | 12/2003 | Laurel | |
| 6,668,933 B2 | 12/2003 | Kent | |
| 6,681,860 B1 | 1/2004 | Yokley et al. | |
| 6,712,145 B2 | 3/2004 | Allamon | |
| 6,712,415 B1 | 3/2004 | Darbishire et al. | |
| 6,834,726 B2 | 12/2004 | Giroux et al. | |
| 6,866,100 B2 | 3/2005 | Gudmestad et al. | |
| 6,896,049 B2 | 5/2005 | Moyes | |
| 6,948,561 B2 | 9/2005 | Myron et al. | |
| 6,983,795 B2 | 1/2006 | Zuklic et al. | |
| 7,150,326 B2 | 12/2006 | Bishop et al. | |
| 7,322,408 B2 | 1/2008 | Howlett | |
| 7,325,617 B2 | 2/2008 | Murray | |
| 7,337,847 B2 | 3/2008 | McGarian et al. | |
| 7,350,578 B2 | 4/2008 | Szarka et al. | |
| 7,377,321 B2 | 5/2008 | Rytlewski | |
| 7,387,165 B2 | 6/2008 | Lopez de Cardenas et al. | |
| 7,416,029 B2 | 8/2008 | Telfer et al. | |
| 7,467,664 B2 | 12/2008 | Cochran et al. | |
| 7,503,390 B2 | 3/2009 | Gomez | |
| 7,503,392 B2 | 3/2009 | King et al. | |
| 7,520,336 B2 | 4/2009 | Mondelli et al. | |
| 7,730,953 B2 | 6/2010 | Casciaro | |
| 7,832,472 B2 | 11/2010 | Themig | |
| 2001/0007284 A1 | 7/2001 | French et al. | |
| 2004/0007365 A1 | 1/2004 | Hill et al. | |
| 2005/0061372 A1 | 3/2005 | McGrath et al. | |
| 2005/0072572 A1 | 4/2005 | Churchill | |
| 2005/0126638 A1 | 6/2005 | Gilbert | |
| 2005/0205264 A1 | 9/2005 | Starr et al. | |
| 2006/0124310 A1 | 6/2006 | Lopez de Cardenas et al. | |
| 2006/0169463 A1 | 8/2006 | Howlett | |
| 2006/0175092 A1 | 8/2006 | Mashburn | |
| 2006/0213670 A1 | 9/2006 | Bishop et al. | |
| 2006/0243455 A1 | 11/2006 | Telfer et al. | |
| 2007/0012438 A1 | 1/2007 | Hassel-Sorensen | |
| 2007/0023087 A1 | 2/2007 | Krebs et al. | |
| 2007/0095538 A1 | 5/2007 | Szarka et al. | |
| 2007/0272413 A1 | 11/2007 | Rytlewski et al. | |
| 2008/0066924 A1 | 3/2008 | Xu | |
| 2008/0093080 A1 | 4/2008 | Palmer et al. | |
| 2008/0190620 A1 | 8/2008 | Posevina et al. | |
| 2008/0217025 A1 | 9/2008 | Ruddock et al. | |
| 2008/0308282 A1 | 12/2008 | Standridge et al. | |
| 2009/0032255 A1 | 2/2009 | Surjaatmadja et al. | |
| 2009/0044946 A1* | 2/2009 | Schasteen et al. | 166/319 |
| 2009/0044955 A1 | 2/2009 | King et al. | |
| 2009/0056934 A1 | 3/2009 | Xu | |
| 2009/0056952 A1 | 3/2009 | Churchill | |
| 2009/0107680 A1 | 4/2009 | Surjaatmadja | |
| 2009/0159289 A1 | 6/2009 | Avant et al. | |
| 2009/0308588 A1 | 12/2009 | Howell et al. | |
| 2010/0294514 A1 | 11/2010 | Crow et al. | |
| 2011/0180274 A1 | 7/2011 | Wang et al. | |

FOREIGN PATENT DOCUMENTS

| | | |
|---|---|---|
| GB | 2281924 | 3/1995 |
| WO | 00/15943 | 3/2000 |

OTHER PUBLICATIONS

Notification of Transmittal of the International Search Report and the Written Opinion of the International Searching Authority; PCT/US2010/044383; Mailed Apr. 15, 2011.

International Search Report; PCT/US2010/044399; International Searching Authority KIPO; Mailed Mar. 21, 2011.

Notification of Transmittal of the International Search Report and The Written Opinion of the International Searching Authority; PCT/US2010/054487; International Searching Authority; KIPO; Mailed Jun. 3, 2011.

Notification of Transmittal of the International Search Report and the Written Opinion of the International Searching Authority; PCT/US2010/049810; International Searching Authority KIPO; Mailed Apr. 25, 2011.

International Search Report and Written Opinion of the International Searching Authority; PCT/US2010/044378; Mailed Mar. 17, 2011.

International Search Report; PCT/US2010/033737; Korean Intellectual Property Office; Mailed Jan. 24, 2011.

International Search Report; Date of Mailing Jan. 24, 2011; International Appln No. PCT/US2010/034736; 3 pages.

International Search Report; Date of Mailing Jan. 24, 2011; Internatiaonal Appln. No. PCT/US2010/034752; 3 pages.

Nternational Search Report and Written Opinion; Date of Mailing Feb. 11, 2011; International Appln No. PCT/US2010/041049; International Search Report 5 pages and Written Opinion 3 pages.

Response to Office Action dated Oct. 15, 2008, in U.S. Appl. No. 11/891,713, U.S. Patent and Trademark Office, U.S.A.

Office Action dated Jun. 25, 2009, in U.S. Appl. No. 11/891,714, USPTO, U.S.A.

Office Action dated Jun. 19, 2009, in U.S. Appl. No. 11/891,715, U.S. Patent and Trademark Office, U.S.A.

Response to Restriction Requirement dated Apr. 22, 2009 in U.S. Appl. No. 11/891,715, U.S. Patent and Trademark Office, U.S.A.

Office Action dated Apr. 9, 2009, in U.S. Appl. No. 11/891,715, U.S. Patent and Trademark Office, U.S.A.

Notice of Allowance & Fees Due and Notice of Allowability dated Jan. 5, 2009, in U.S. Appl. No. 11/891,713, U.S. Patent and Trademark Office, U.S.A.

Office Action dated Jul. 16, 2008 in U.S. Appl. No. 11/891,713 U.S. Patent and Trademark Office, U.S.A.

International Search Report, Feb. 11, 2009 pp. 1-3, PCT/US2008/072732, Korean Intellectual Property Office.

Notification of Transmittal of the International Search Report and the Written Opinion of the International Searching Authority, or the Declaration, Feb. 11, 2009, pp. 1-4, PCT/US2008/072732, Korean Intellectual Property Office.

Notification of Transmittal of the International Search Report and the Written Opinion of the International Searching Authority, or the Declaration, Feb. 11, 2009, pp. 1-4, PCT/US2008/072734, Korean Intellectual Property Office.

Written Opinion of the International Searching Authority, Feb. 11, 2009, pp. 1-3, PCT/US2008/072732, Korean Intellectual Property Office.

Written Opinion of the International Searching Authority, Feb. 11, 2009, pp. 1-4, PCT/US2008/072734, Korean Intellectual Property Office.

International Search Report, Feb. 11, 2009, pp. 1-3, PCT/US2008/072734, Korean Intellectual Property Office.

International Search Report, Feb. 11, 2009, pp. 1-3, PCT/US2008/072735, Korean Intellectual Property Office.

Notification of Transmittal of the International Search Report and the Written Opinion of the International Searching Authority, or the Declaration, Feb. 11, 2009, pp. 1-4, PCT/US2008/072735, Korean Intellectual Property Office.

Notification of Transmittal of the International Search Report and the Written Opinion of the International Searching Authority, or the Declaration, Jan. 19, 2009, pp. 1-4, PCT/US2008/072470, Korean Intellectual Property Office.

Written Opinion of the International Searching Authority, Feb. 11, 2009, pp. 1-4, PCT/US2008/072735, Korean Intellectual Property Office.

Written Opinion of the International Searching Authority, Jan. 19, 2009, pp. 1-3, PCT/US2008/072470, Korean Intellectual Property Office.

International Search Report, Jan. 19, 2009, pp. 1-3, PCT/US2008/072470, Korean Intellectual Property Office.

Baker Hughes, Baker Oil Tools, Conventional Fishing Technical Unit; Pump Out Sub Product Family No. H14061, Jun. 7, 2005, 1 page.

Ross, C. M., et al., "Current Materials and Devices for Control of Fluid Loss," SPE 54323, Apr. 1999, pp. 1-16.

Hoffman, C.R., "One-Trip Sand-Control/Liner Hangar/ Big-Bore Completion System," SPE 101086, Sep. 2006, pp. 1-10.

G.L. Rytlewski, A Study of Fracture Initiation Pressures in Cemented Cased-Hole Wells Without Perforations, May 15, 2006, pp. 1-10, SPE 100572, Society of Petroleum Engineers, U.S.A.

Boscan, J., et al., "Successful Well Testing Operations in High-Pressure/High-Temperature Encironment; Case Histories," SPE 84096, Oct. 2003, pp. 1-15.

Brad Musgrove, Multi-Layer Fracturing Solution Treat and Produce Completions, Nov. 12, 2007, pp. 1-23, Schlumberger, U.S.A.

RFID Keystone Module, RFID & Intelligent Products, Petrowell retrieved online on May 27, 2009 from: http://www.petrowell.co.uk/index2.php?option=com_docman&task=doc_view&gid=15&Itemid=26.

StageFRAC Maximize Reservoir Drainage, 2007, pp. 1-2, Schlumberger, U.S.A.

TAP Completion System, Schlumberger, 4 pages, Dec. 2007.

International Search Report and Written Opinion; Date of Mailing Aug. 29, 2011; International Application No. PCT/US2011/022523; International Filing Date Jan. 26, 2011; Korean Intellectual Property Office; International Search Report 5 pages; Written Opinion 3 pages.

Notification of Transmittal of The International Search Report and the Written Opinion of the International Searching Authority; PCT/US2011/041663; Korean Intellectual Property Office; Mailed Dec. 14, 2011; 8 pages.

* cited by examiner

TUBULAR ACTUATOR AND METHOD

BACKGROUND

In industries concerned with earth formation boreholes, such as hydrocarbon recovery and gas sequestration, for example, it is not uncommon for various operations to utilize a temporary or permanent plugging device. Sometimes plugging is desirable at a first location, and subsequently at a second location. Moreover, additional plugging locations may also be desired and the plugging can be sequential for the locations or otherwise. Systems employing droppable members, such as balls, for example, are typically used for just such a purpose. The ball is dropped to a ball seat positioned at the desired location within the borehole thereby creating the desired plug.

In applications where the first location is further from surface than the second location, it is common to employ seats with sequentially smaller diameters at locations further from the surface. Dropping balls having sequentially larger diameters allows the ball seat furthest from surface to be plugged first (by a ball whose diameter is complementary to that seat), followed by the ball seat second furthest from surface (by a ball whose diameter is complementary to that seat) and so on.

The foregoing system, however, creates increasingly restrictive dimensions within the borehole that can negatively impact flow therethrough as well as limit the size of tools that can be run into the borehole. Systems and methods that allow operators to plug boreholes at multiple locations without the drawbacks mentioned would be well received in the art.

BRIEF DESCRIPTION

Disclosed herein is a tubular actuator. The tubular actuator includes, a restrictor disposed at a tubular that is engageably receptive to a runnable member run thereagainst as long as pressure remains above a latch pressure, the restrictor configured to allow passage of the runnable member after a delay at pressure equal to or below the latch pressure.

Further disclosed herein is a method of selectively actuating a tubular actuator. The method includes, running a runnable member within a tubular, engaging a restrictor with the runnable member, pressuring up to a selected pressure to do at least one of the following: pressuring up to pressure above a latch pressure to movably actuate the restrictor relative to the tubular, pressuring up to pressure at or below the latch pressure for a time delay, and passing the runnable member by the restrictor after the time delay.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Embodiments of a tubular actuator disclosed herein allow an operator to selectively actuate or selectively pass each of one or more of the tubular actuators disposed within a tubular. The operator runs a runnable member to engage with the tubular actuator(s) and then either pressures up to above a latch pressure to perform an actuation process or to below the latch pressure to allow the runnable member to pass through the tubular actuator thereby avoiding performance of an actuation.

Figure 1:
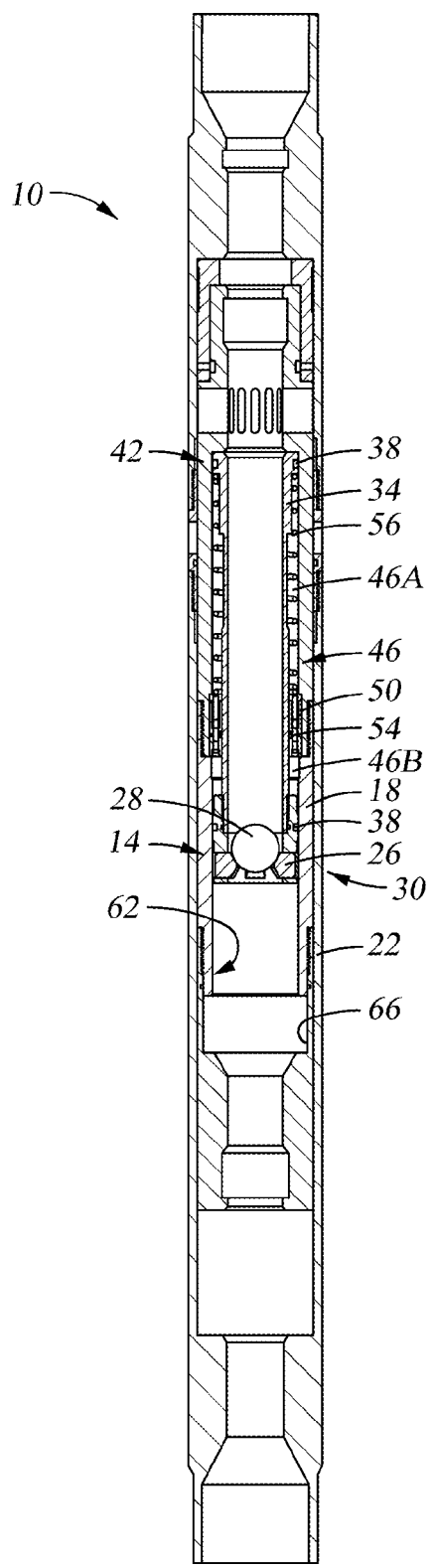
FIG. 1 depicts a cross sectional view of a tubular actuator disclosed herein in a run in position.

Referring to FIG. 1, an embodiment of the tubular actuator disclosed herein is illustrated generally at 10. The tubular actuator 10 includes, a restrictor 14 having a body 18, which is movable within a tubular 22 during actuation, and a seat 26 that is sealingly engageably receptive of a runnable member 28, illustrated herein as a ball. The seat 26 is selectively defeatable such that the ball 28 is able to pass as will be explained in detail below. The seat 26 in this embodiment is attached to an end 30 of a sleeve 34. The sleeve 34 is slidably sealingly engaged with the body 18 by seals 38, illustrated herein as o-rings, at both the end 30 and an opposing end 42 thereby creating a chamber 46, defined by the annular space between the body 18 and the sleeve 34 and bound at the ends 30, 42 by the two o-rings 38, that is fluidically isolated. The chamber 46 is divided into two sub-chambers 46A and 46B by a shoulder 50 extending from the body 18 and slidably sealingly engaged with the sleeve 34. One or more ports 54 in the shoulder 50 fluidically connect the sub-chambers 46A and 46B to one another. As such, movement of the sleeve 34 relative to the body 18 causes fluid, such as hydraulic oil, for example, housed within the chamber 46 to be pumped from one of the sub-chambers 46A, 46B to the other of the sub-chambers 46A, 46B through the port(s) 54. The foregoing structure allows an operator to control a time for the sleeve 34 to move through a full stroke by adjustment of the size and number of the port(s) 54 used. Regardless of whether the sleeve 34 has been fully stroked, a reduction in pressure can allow the sleeve 34 to move back to its original position under the influence of a biasing member 56, illustrated herein as a compression spring, compressingly engaged between the sleeve 34 and the body 18.

Figure 2:
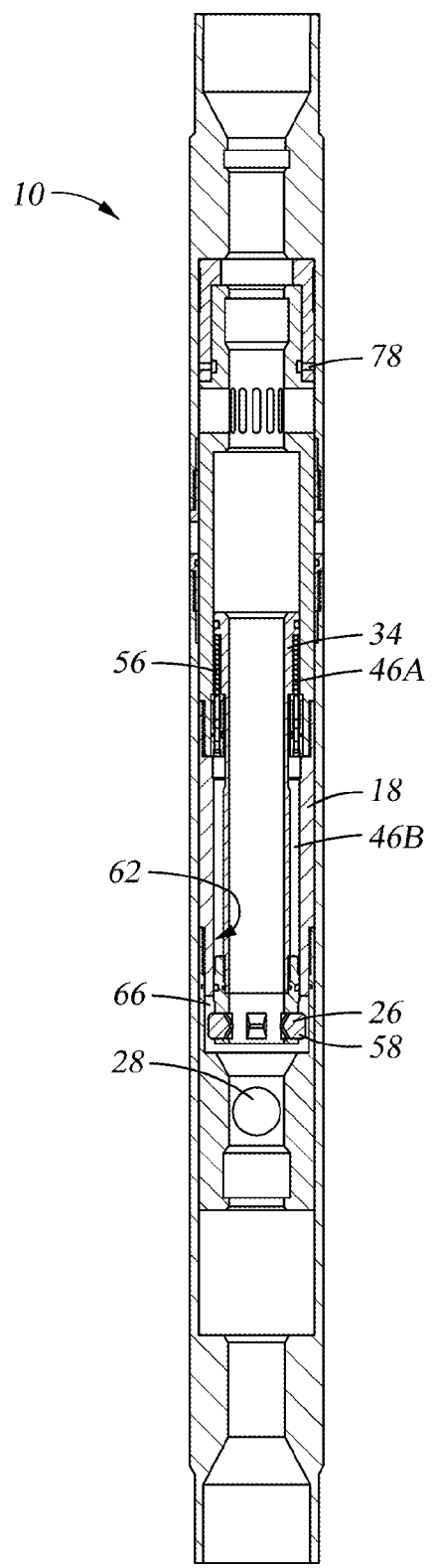
FIG. 2 depicts a cross sectional view of the tubular actuator of FIG. 1 in a position that allows passage of a runnable member.

Referring to FIG. 2, the seat 26 becomes defeatable once the sleeve 34 has fully stroked relative to the body 18. In this embodiment the seat 26 includes a plurality of seat sections 58 that are radially expandable to allow passage of the ball 28 when the seat sections 58 are not supported by an inner radial surface 62 of the body 18. Since the seat sections 58 are radially supported by the inner radial surface 62 at all relative locations of the sleeve 34 and body 18 other than the fully stroked position (wherein the seat sections 58 are able to move into an inner recess 66), it is only when the sleeve 34 is in the fully stroked position, as illustrated in FIG. 2, that the ball 28 is allowed to pass. Moving the sleeve 34 to the fully stroked position can be done by applying pressure to a ball 28 seated against the seat 26, thereby urging the sleeve 34 to move.

Movement of the sleeve 34 relative to the body 18, however, is prevented if pressure applied to the seated ball 28 exceeds a latch pressure defined as the pressure at which latching occurs between the sleeve 34, (or the seat 26 itself) and the body 18. This latching can be through an increase in frictional engagement between the sleeve 34, the seat 26, or both, and the inner radial surface 62 of the body 18 for example. Alternate latching engagement mechanisms are contemplated but not disclosed in further detail herein.

Figure 3:
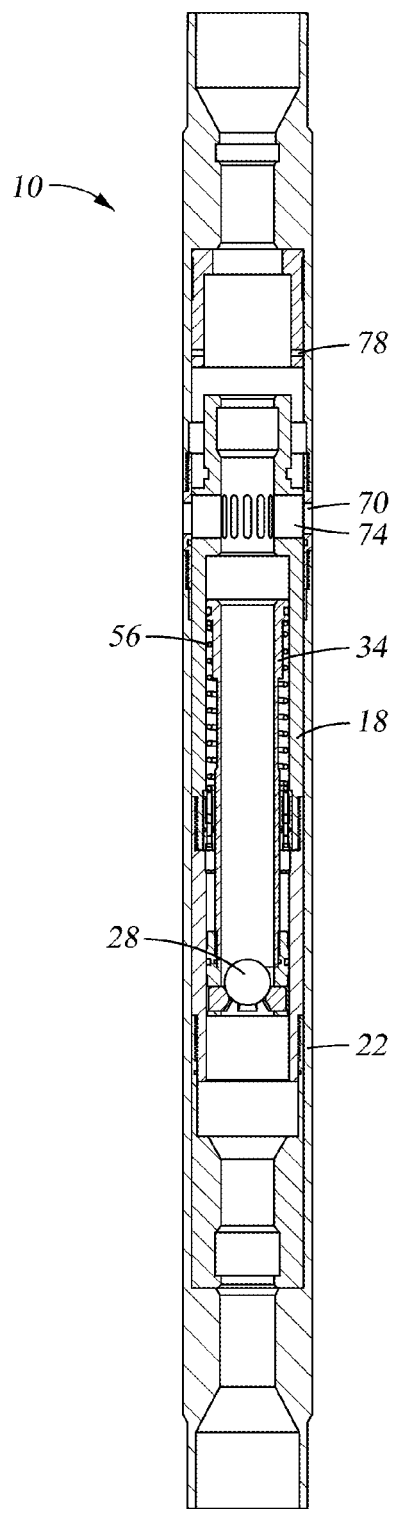
FIG. 3 depicts a cross sectional view of the tubular actuator of FIG. 1 in an actuated position.
Figure 4:
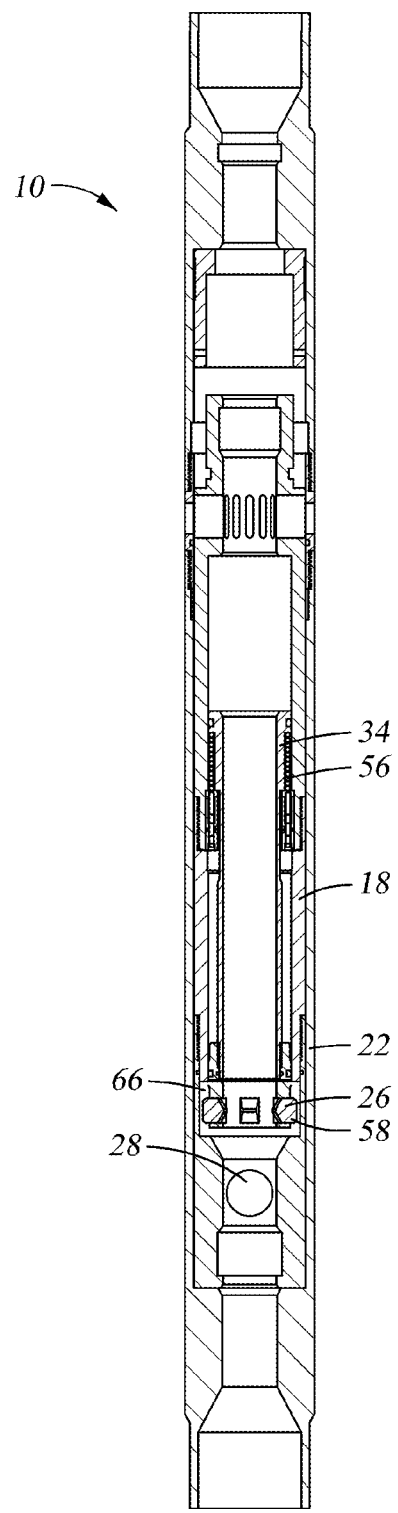
FIG. 4 depicts a cross sectional view of the tubular actuator of FIG. 1 in an actuated position with the seat in a defeatable position having passed a runnable member therethrough.

Referring to FIG. 3, when pressure exceeding the latch pressure is supplied prior to the sleeve 34 completing a full stroke, the sleeve 34 becomes longitudinally fixed relative to the body 18. Once the sleeve 34 is latched to the body 18, all of the forces generated by pressure against the seated ball 28 are transferred through the body 18 to the tubular 22. This force can be used to move the body 18 relative to the tubular 22 in an actuating event. For example, the body 18 may block one or more ports 70 in the tubular 22 while in its original position (FIGS. 1 and 2), and then effectively open the port(s) 70 by aligning them with one or more ports 74 in the body 18 after the body 18 has moved (FIGS. 3 and 4). Such an actuation can be used to provide selective access to a formation outside the tubular 22 for fracturing, for example, in a downhole hydrocarbon or sequestration application. Additionally, one or more releasable members 78, shown herein as shear screws, may longitudinally attach the body 18 to the tubular 22 until a selectable load, such as by a threshold pressure, is applied therebetween, to prevent inadvertent actuation of the tubular actuator 10.

Referring to FIG. 4, the ball 28 may still be allowed to pass after the tubular actuator 10 has been actuated. To do so, one would simply reduce the pressure after the actuation is completed to pressure below the latch pressure. In so doing the sleeve 34 becomes unlatched from the body 18 and permits the sleeve 34 to move relative to the body 18. After full stroking of the sleeve 34 has occurred the seat sections 58 can expand radially into the inner recess 66 and allow the ball 28 to pass therethrough, as is illustrated in FIG. 4. After passage of the ball 28 the biasing member 56 can return the sleeve 34 to its original position with respect to the body 18, thereby being reset to a position engagable by another of the balls 28.

Positioning a plurality of the tubular actuators 10 along the tubular 22 allows an operator to selectively actuate any one of the plurality of actuators 10 regardless of the number of actuators 10 between it and the origin of entry for the balls 28.

Referring to FIGS. 5-9, an alternate embodiment of a tubular actuator disclosed herein is illustrated generally at 110. The tubular actuator 110 includes, a restrictor 114 having a body 118, which is movable within a tubular 122, and at least one support member 130, with multiple support members 130 being illustrated in this embodiment. The restrictor 114 also has a seat 126 that is sealingly engageably receptive to a runnable member 128, illustrated herein as an extrudable ball. The seat 126 is attached to an end of a sleeve 134 and is movable within the body 118. The actuator 110 is similar to the actuator 10 in that chambers 46A and 46B are fluidically connected to each other by port(s) 54 that control a rate at which fluid is able to flow between the two chambers 46A and 46B. This rate of fluid flow controls a rate of movement of the sleeve 134 with respect to the body 118. Unlike the actuator 10, however, wherein passage of the runnable member 28 was prevented until the sleeve 34 had been fully stroked, in the actuator 110 the runnable member 128 is only allowed to pass the restrictor 114 prior to full stroking of the sleeve 34. This passage is due to extrusion of the runnable member 128 by the seat 126 if pressure exceeding a threshold pressure is applied thereagainst prior to repositioning of the support members 130.

Figures 5, 6:
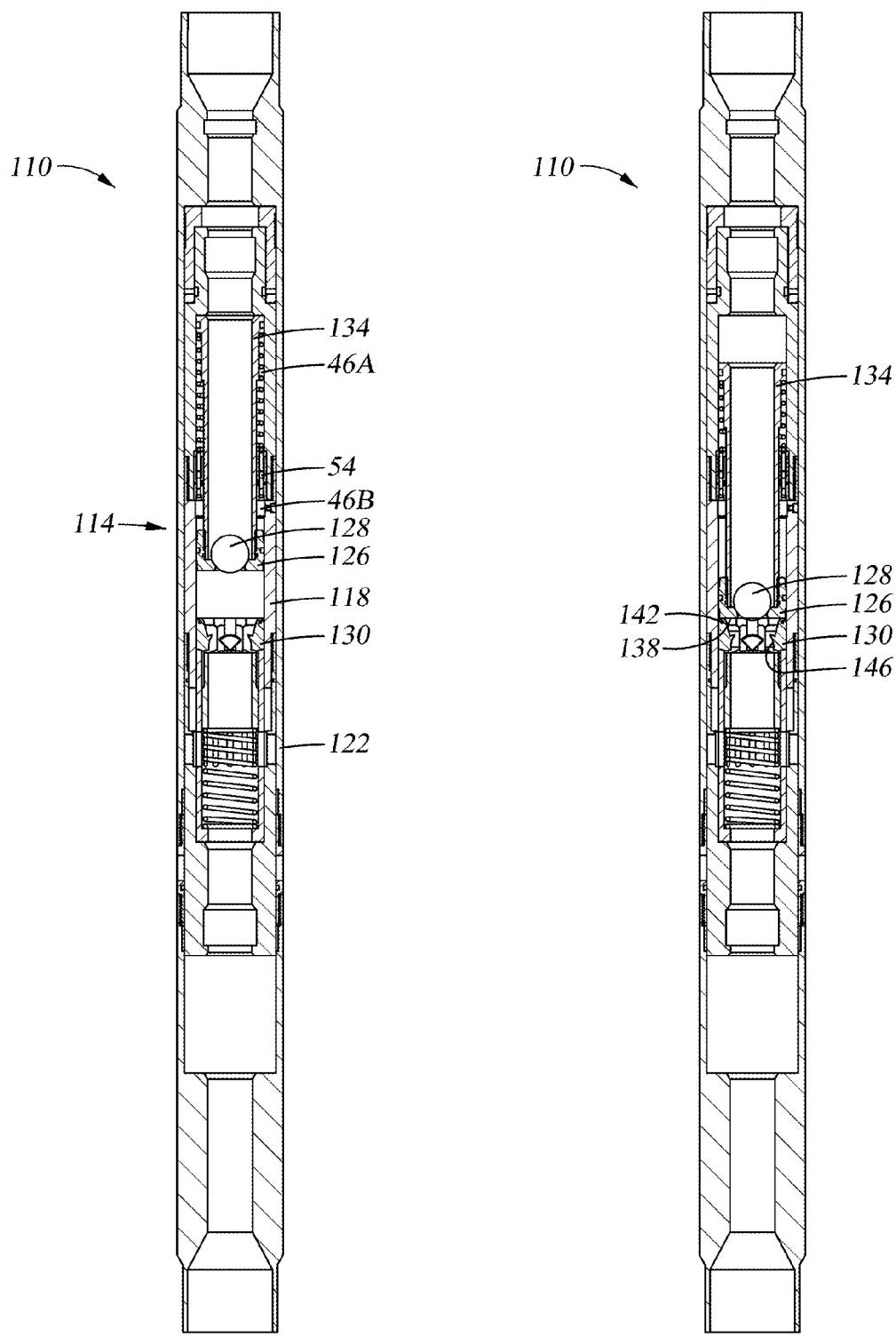
FIG. 5 depicts a cross sectional view of an alternate tubular actuator disclosed herein in a position passable of a runnable member.
FIG. 6 depicts a cross sectional view of the tubular actuator of FIG. 5 in a position with a runnable member seated thereat.
Figure 7:
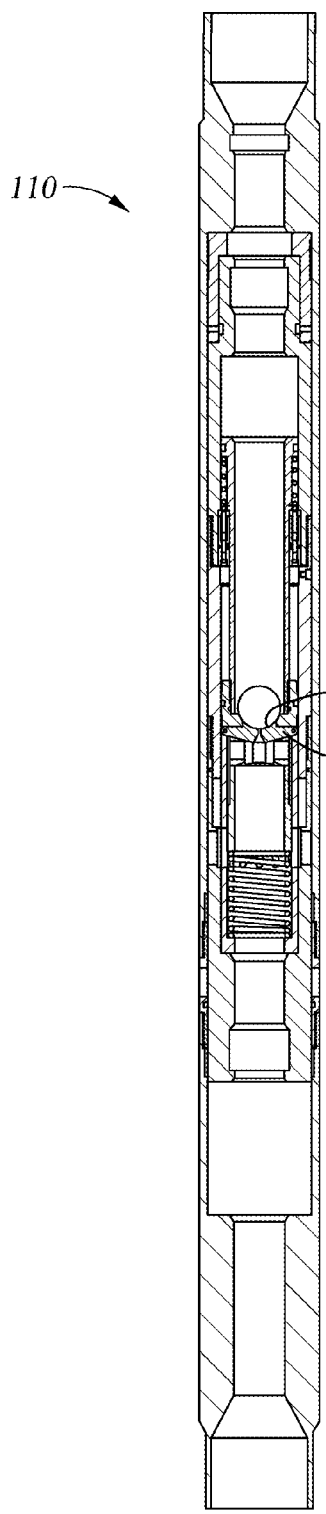
FIG. 7 depicts a cross sectional view of the tubular actuator of FIG. 5 in a position wherein the seat is supported.
Figure 8:
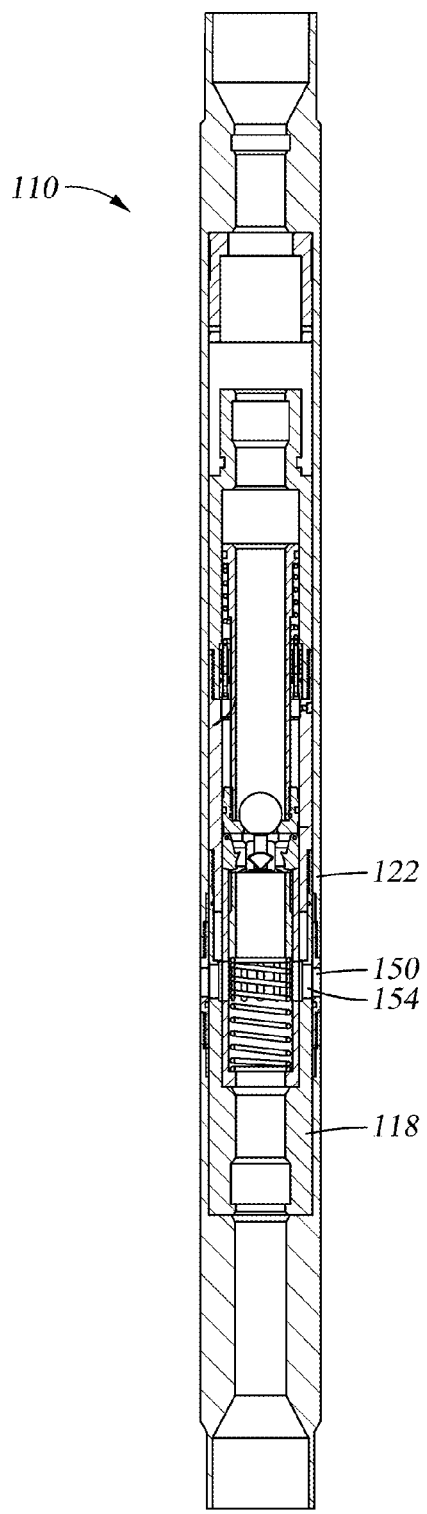
FIG. 8 depicts a cross sectional view of the tubular actuator of FIG. 5 in an actuated position.
Figure 9:
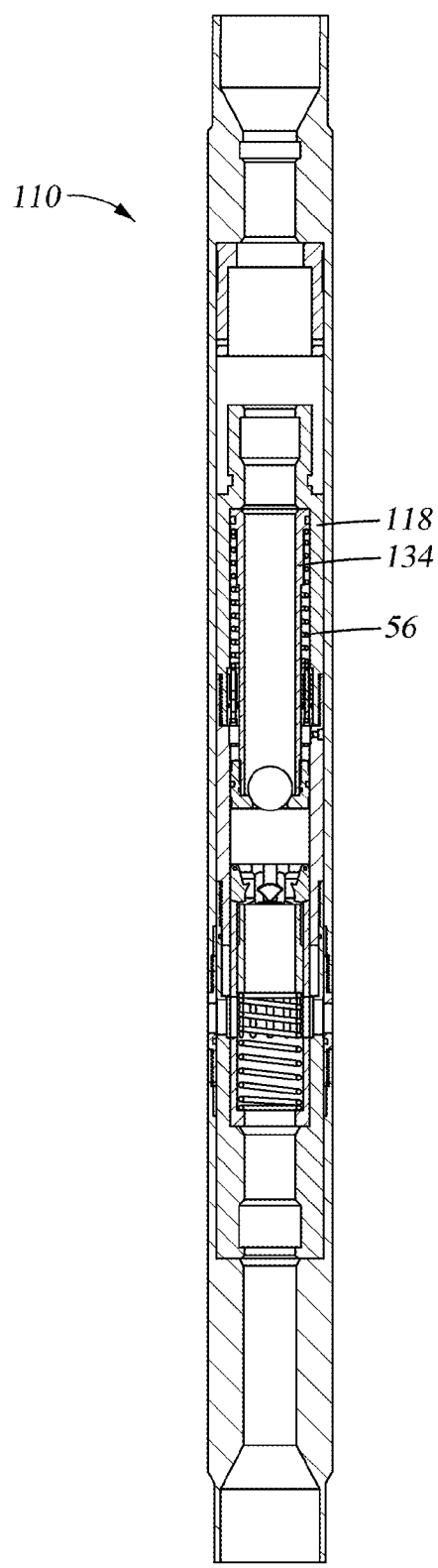
FIG. 9 depicts a cross sectional view of the tubular actuator of FIG. 5 in a position where the sleeve has reset relative to the body.

Referring to FIG. 6, the sleeve 134 as illustrated is in a fully stroked position. As such, ends 138 of seat 126 have contacted cams 142 on each of the support members 130 causing the support members 130 to rotate to the support position shown in FIG. 7 thereby presenting support surfaces 146 to the runnable member 128. Consequently, further increases in pressure against the engaged runnable member 128 will urge the body 118 to move relative to the tubular 122 (to the position shown in FIG. 8), instead of extruding the runnable member 128 past the restrictor 114. The foregoing structure allows an operator, by selectively controlling a pressure versus time profile, to selectively pass the runnable member 128 beyond the restrictor 114 or to selectively move the restrictor 114 to a supported position to thereby allow actuational movement of the body 118 relative to the tubular 122.

The actuator 110 is further configured to allow passage of the runnable member 128 even after the support members 130 have rotated and supported the runnable member 128. To do so requires the pressure against the runnable member 128 to be decreased to a level below a biasing force of the biasing member 56 that, as described with reference to FIG. 4, biases the sleeve 134 to return to its original position with respect to the body 118. Doing so in this embodiment positions the restrictor 114 in a position to be passable or actuatable through engagement with another of the runnable members 128.

The embodiment of FIGS. 5-9 is also configured to open ports 150 in the tubular 122 by aligning ports 154 in the body 118, thereby providing fluidic communication between an inside and an outside of the tubular 122. Such fluidic communication is useful for production of hydrocarbons, for example, in an application directed to hydrocarbon recovery. Additionally, such fluidic communication allows for fracturing of a downhole formation through pressurization of the formation through the open ports 150, 154.

Figure 10:
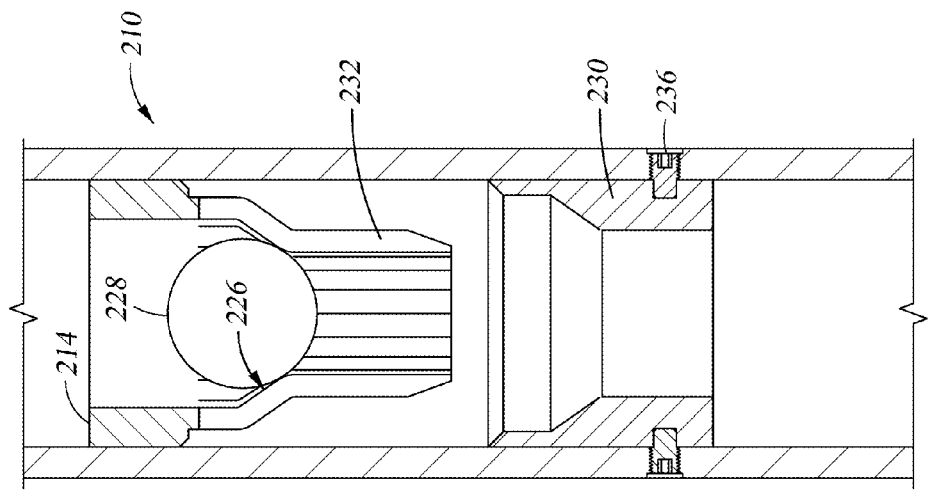
FIG. 10 depicts a partial cross sectional view of an alternate embodiment of a tubular actuator disclosed herein in a position wherein a runnable member is seated thereon.
Figure 11:
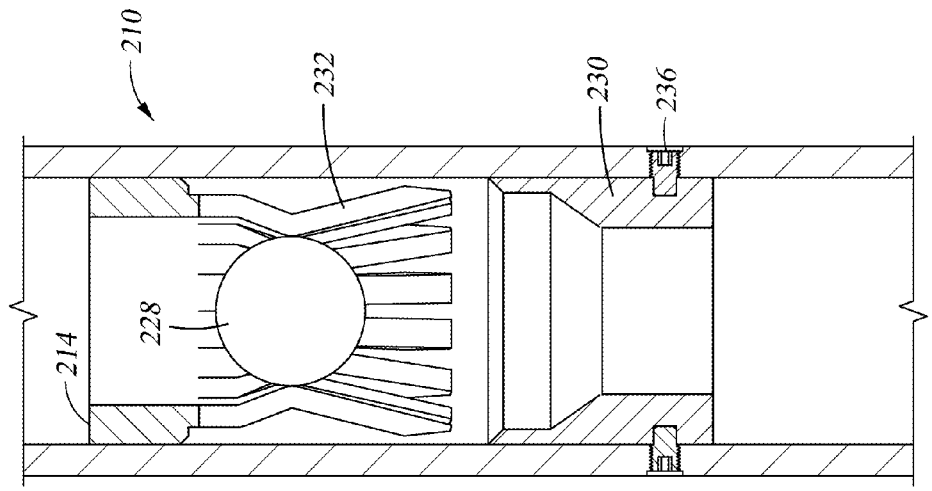
FIG. 11 depicts a partial cross sectional view of the tubular actuator of FIG. 10 in a defeatable position about to pass a runnable member thereby.
Figure 12:
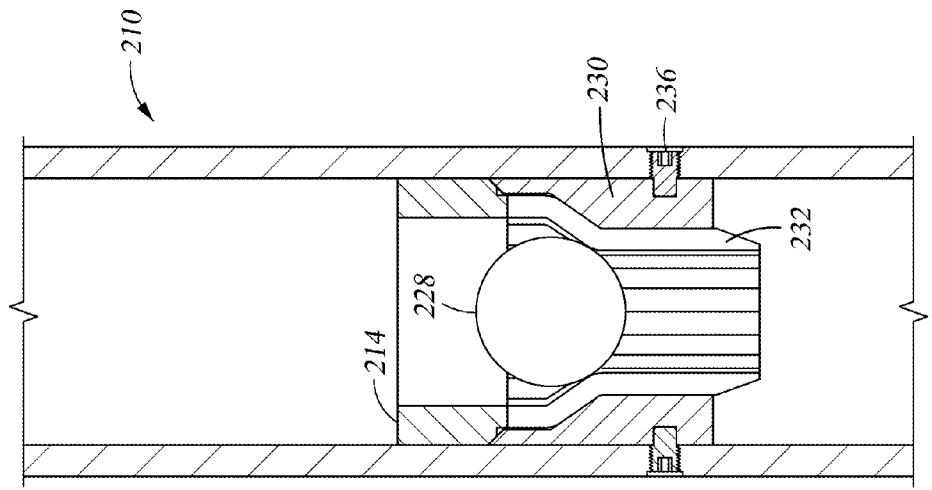
FIG. 12 depicts a partial cross sectional view of the tubular actuator of FIG. 10 in a position with the runnable member seated and the seat being supported.

Referring to FIGS. 10-12, an alternate embodiment of a tubular actuator is illustrated generally at 210. The actuator 210 is similar to the actuator 110 in that a runnable member 228 is passable thereby in response to a threshold pressure being provided against the runnable member 228 prior to expiration of a time delay, and whereas, increases in pressure beyond the threshold pressure only after the time delay has expired will not result in passage of the runnable member 228 thereby. The actuator 210 differs from the actuator 110 in that the runnable member 228 does not deform and extrude through a restrictor 214, as does the runnable member 128 by the restrictor 114. Instead, a seat 226 of the restrictor 214 repositions, or deforms as is illustrated in this embodiment, to allow passage of the runnable member 228 (the runnable member 228 remaining in a nondeformed condition).

Structurally, the seat 226 of the restrictor 214 is cantilevered on fingers 232 that can flex radially outwardly when loads due to pressure exceeding a threshold pressure are applied against the runnable member 228. Additionally, the seat 226 can be mounted on a sleeve with fluidic chambers to control movement of the seat 226 relative to a tubular 222 as is done in the above embodiments, additionally, other means of damping movement can be employed. A support member 230 positioned downstream of the restrictor 214, as defined by the direction of pressure supplied against the runnable member 228, is configured to support the fingers 232 from outward radial expansion if the restrictor 214 moves into overlapping engagement with the support member 230 prior to passage of the runnable member 228 by the restrictor 214. Support of the fingers 232 by the support member 230 prevent radial outward deflection of the fingers 232 that is necessary to pass the runnable member 228 by the restrictor 214. As such, an operator can selectively pass the runnable member 228 by the restrictor 214 or have the runnable member 228 actuationally engage with the restrictor 214 by selectively controlling a pressure versus time profile of the pressure applied to the runnable member 228 once seated on the seat 226.

Actuation of the actuator 210 can be accomplished by pressuring up to pressure greater than the threshold pressure against the runnable member 228 seated against the seat 226 after the restrictor 214 has moved into supporting engagement with the support member 230. One or more releasable members 236, illustrated herein as shear screws, can releasable attach the actuator 210 to the tubular 222 until a sufficient load is applied to release the releasable members 236, thereby allowing the actuator 210 to actuate relative to the tubular 222.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A tubular actuator, comprising a restrictor disposed at a tubular being engagably receptive to a runnable member run thereagainst the restrictor being configured to prevent passage of the runnable member thereby as long as pressure applied against the runnable member engaged therewith remains above a latch pressure while allowing passage of the runnable member after a delay after having reduced pressure to a value equal to or below the latch pressure;
   wherein the restrictor includes a seat that is seatingly engagably receptive to the runnable member; and
   wherein the seat is defeatable after the delay to allow passage of the runnable member thereby.

2. The tubular actuator of claim 1, wherein the seat is radially expandable after the delay.

3. The tubular actuator of claim 1, wherein the restrictor includes a body and the seat is movable relative to the body at pressure below the latch pressure.

4. The tubular actuator of claim 3, wherein movement of the seat relative to the body to a release position allows passage of the runnable member by the seat.

5. The tubular actuator of claim 3, wherein movement of the seat relative to the body defines the delay.

6. The tubular actuator of claim 3, wherein a rate of movement of the seat relative to the body is controlled by fluid flow.

7. The tubular actuator of claim 3, wherein the seat and the body are configured to prevent relative movement therebetween in response to pressure greater than the latch pressure being applied against the runnable member seated against the seat.

8. The tubular actuator of claim 7, wherein the seat and the body are configured to allow relative movement therebetween after having prevented such movement in response to a drop in pressure to or below the latch pressure.

9. The tubular actuator of claim 7, wherein the seat is repositionable to a position the seat had relative to the body prior to the relative movement therebetween in response to reductions in pressure to below a reset pressure.

10. The tubular actuator of claim 9, wherein repositionability of the seat to the position the seat had relative to the body prior to the relative movement therebetween is automatic.

11. The tubular actuator of claim 3, wherein the body is configured to move relative to the tubular at pressure equal to or greater than the latch pressure.

12. The tubular actuator of claim 11, further comprising at least one releasable member configured to retain the body relative to the tubular until the pressure has exceeded a threshold pressure.

13. A method of selectively actuating a tubular actuator, comprising:
   running a runnable member within a tubular;
   engaging a seat of a restrictor with the runnable member;
   pressuring up to pressure above a latch pressure;
   removably latching the seat of the restrictor to a body of the restrictor with pressure supplied by the pressuring up as long as pressure remains above the latch pressure;
   reducing pressure to pressure at or below the latch pressure for a time delay; and
   passing the runnable member by the seat of the restrictor after the time delay without an additional increase in the pressure above the latch pressure.

14. The method of selectively actuating the tubular actuator of claim 13, further comprising seatingly engaging the runnable member on a defeatable seat of the restrictor.

15. The method of selectively actuating the tubular actuator of claim 13, further comprising latchingly engaging a seat of the restrictor with a body of the restrictor in response to pressuring up to pressure above the latch pressure.

16. The method of selectively actuating the tubular actuator of claim 13, further comprising moving the seat of the restrictor relative to the body of the restrictor in response to pressuring up to pressure below the latch pressure.

17. The method of selectively actuating the tubular actuator of claim 13, further comprising pumping fluid through one or more ports to control duration of the time delay.

18. The method of selectively actuating the tubular actuator of claim 13, further comprising radially expanding a seat after expiration of the time delay.

19. The method of selectively actuating the tubular actuator of claim 13, further comprising pressuring up to pressure above the latch pressure to movably actuate the restrictor relative to the tubular.

* * * * *